United States Patent [19]

Davis et al.

[11] 4,267,079

[45] May 12, 1981

[54] CURED RUBBER SKIM COMPOSITIONS EXHIBITING BETTER HUMIDITY AGED METAL ADHESION AND METAL ADHESION RETENTION

[75] Inventors: James A. Davis, Uniontown; Robert C. Koch, Akron, both of Ohio

[73] Assignee: The Firestone Tire & Rubber Company, Akron, Ohio

[21] Appl. No.: 93,463

[22] Filed: Nov. 13, 1979

[51] Int. Cl.³ .............................................. C08L 15/02
[52] U.S. Cl. ............................... 260/3.5; 152/356 R; 152/359; 156/110 A; 156/124; 260/3; 260/42.34; 428/462; 428/465; 525/215
[58] Field of Search .......................... 260/3, 5, 3.3, 3.5, 260/42.34; 156/110 A, 124; 428/462, 465; 152/359; 525/215

[56] References Cited

U.S. PATENT DOCUMENTS

| | | | |
|---|---|---|---|
| 2,482,600 | 9/1949 | Sarbach | 260/5 |
| 2,581,920 | 1/1952 | Kuhn | 260/5 |
| 3,596,753 | 8/1971 | Knapp et al. | 260/5 |
| 3,639,308 | 2/1972 | Topcik | 260/5 |
| 3,645,934 | 2/1972 | Caywood, Jr. | 260/5 |

*Primary Examiner*—Theodore E. Pertilla

[57] ABSTRACT

Disclosed is an improved cured rubber skim stock composition containing natural rubber utilized in the manufacture of tires, conveyor belts, hoses and the like, and with metallic reinforcement cords embedded therein. The improvement comprises from about 5 to about 25 parts by weight of Neoprene replacing an equivalent amount of natural rubber in order to impart better rubber-to-metal adhesion and adhesion retention between the rubber skim stock and the metallic reinforcement following exposure to long term humidity chamber tests.

4 Claims, No Drawings

CURED RUBBER SKIM COMPOSITIONS EXHIBITING BETTER HUMIDITY AGED METAL ADHESION AND METAL ADHESION RETENTION

TECHNICAL FIELD

The present invention is directed to improving the adhesion and adhesion retention between a rubber skim stock composition containing natural rubber, used in the manufacture of tires, conveyor belts, hoses and the like, and metallic reinforcement cord such as steel wire and cable which commonly carries a protective coating of zinc or brass.

In the manufacture of the foregoing rubber articles, particularly steel-belted bias and radial tires, it has become common to reinforce the rubber skim stock material with steel wire or cable. The metallic reinforced rubber is employed as a belt, one or more of which is circumferentially oriented beneath the tread stock to maintain the integrity and shape of the tire during inflation and subsequent load. In order for the belt to function effectively, it is imperative that adhesion between the rubber and the steel cord be effectively maintained. Because steel is prone to oxidation, which even in minor degree is highly deleterious to the necessary adhesion with the rubber skim stock, and it would be most impractical to incorporate a chemically clean, oxidation-free steel cord in the belt at the time of its manufacture, the steel cord is plated with zinc or brass thereby protecting it from oxidation until it can be used.

While adhesion between zinc or brass-plated steel cord and rubber is generally far greater than that between the latter and oxidized steel, existing data determined from article life as well as modern testing techniques indicates that adhesion obtained between plated steel cord and the elastomer must be increased for improved article life and service. Adhesion must also be improved between the rubber skim stock and bright steel, i.e., surfaces of the cord which are neither plated nor oxidized, generally occurring when the steel cords and rubber skim stock are cut to size from larger, calendered sheets of the reinforced rubber stock.

We have determined that the incorporation of small amounts of Neoprene (polychloroprene) into the natural rubber skim stock will improve adhesion between zinc or brass-plated steel cord and such skim stocks.

BACKGROUND ART

In order to improve physical properties such as flex-fatigue and heat aged stock properties, it is known to employ chlorinated polymers in a rubber composition. One early patent embodying the former technique is U.S. Pat. No. 2,482,600 which discloses a rubbery composition resistant to heat deterioration for vulcanized tires, conveyor belts and the like. The composition therein described comprised from about 50-90 percent by weight of natural rubber, and 10-50 percent by weight of a mixture of polychloroprene and butadiene-acrylonitrile copolymer. While the rubber articles made with this composition would have been reinforced in a manner known at that time, such as with natural or synthetic fibers, there is no suggestion that improved adhesion between the disclosed composition and wire reinforcement or metal in general would be obtained.

U.S. Pat. No. 3,639,308 disclosed inner liner compositions which could be bonded to the inner wall surface of the carcass of a tubeless rubber tire. The compositions comprised butyl rubber or chlorinated butyl with natural rubber to provide inner liner compositions having improved resistance to air permeability and heat aging. Adhesion tests were conducted with the inner liner composition sandwiched between a ply of carcass stock and outer plies of rubberized tire cord, however, there was no suggestion that improved adhesion between this composition and metal would be obtained. U.S. Pat. No. 3,596,753 to Knapp disclosed an elastomer consisting of a mixture of a nitrile rubber and a polychloroprene to produce a heat-resistant conveyor belt having steel wire supporting inserts. Although the disclosure stated that adhesion to zinc-coated steel wires must be provided, there was no claim that the nitrile rubber-polychloroprene mixture exhibited satisfactory adhesion with the wire. In fact, for improved adhesion, the steel wire was to be coated with an agent such as a cobalt salt soluble in the elastomer.

While others have broadly disclosed natural rubber blends containing polychloroprene or chlorobutyl rubber, the presence of certain chlorinated polymers with natural rubber to improve aged adhesion between rubber skim stocks and metal reinforcement has not been described in any patents or publications of which we are aware.

DISCLOSURE OF THE INVENTION

It is therefore an object of the present invention to provide an improved rubber skim stock containing natural rubber and exhibiting better humidity aged adhesion and adhesion retention with metallic reinforcement such as unplated steel and brass-plated or zinc-plated steel which can be in the form of, for example, wire or cord.

It is another object of the present invention to provide an improved rubber skim stock containing natural rubber and having higher modulus and equivalent elongation at break as compared with existing 100 percent natural rubber skim stocks.

It is still another object of the present invention to provide an improved rubber skim stock containing natural rubber which stock is less sensitive to the absorption of moisture and oxygen in both cured and uncured states.

It is a further object of the present invention to provide an improved rubber skim stock containing natural rubber and having improved heat aged properties and improved adhesion of rubber skim stocks to brass-plated and zinc-plated steel cord following periods of long term humidity chamber aging.

It is yet another object of the present invention to provide a tire having improved adhesion and adhesion retention between the rubber and steel reinforcing elements embedded therein.

It is another object of the present invention to improve coverage of rubber skim stock and adhesion retention thereof with metallic reinforcement in order to minimize corrosion of wire reinforcement and adhesion degradation and thereby allow greater percentages of steel belted radial tires to be retreadable.

These and other objects, together with the advantages thereof over prior art, which shall become apparent from the specification which follows, are accomplished by our invention as hereinafter described and claimed.

The improved rubber skim stock composition of our invention exhibits enhanced adhesion and adhesion retention with metallic reinforcement such as steel, plated with brass or zinc or unplated, and comprises a vulcanizable rubber stock having from about 5 to about 25 parts of polychloroprene, or Neoprene, with about 5 to 10 parts thereof being preferred. The amount of Neoprene added is by weight and replaces an equivalent amount of natural rubber, the total amounts of natural rubber and Neoprene is a rubber skim stock being equal to 100. The improved rubber skim stock has been found to have better adhesion with metallic reinforcement embedded therein than comparable stocks which do not have Neoprene particularly when both are subjected to humidity chamber aging.

PREFERRED MODE FOR CARRYING OUT THE INVENTION

To illustrate our invention a rubber skim stock, Stock A, is presented hereinbelow which is suitable for preparation of rubber articles such as tires. Adhesion between this stock with steel reinforcement subsequent to vulcanization has been measured and is also presented hereinbelow. It is to be understood that the specific composition of the rubber stock provided is not part of the present invention and that it has been presented solely to enable those skilled in the art to have at least one rubber skim stock with which to practice the invention.

As stated hereinabove, practice of the present invention requires the addition of polychloroprene, commonly known as Neoprene, to the otherwise conventional natural rubber skim stock. Neoprenes are generally categorized as G-types, W-types and T-types, each being well known to those skilled in the art. The preferred Neoprene for incorporation into the rubber skim stock is Neoprene W which contains 40 percent chlorine by weight. However, each of the other types of Neoprenes can be substituted for Neoprene W in substantially the same amounts, i.e., 5 to 25 parts by weight wherein the combined parts of natural rubber and Neoprene is 100.

Addition of the Neoprene is directly to the natural rubber and several other ingredients to form a rubber masterbatch. The remaining ingredients including curatives, stabilizers and the like are subsequently added to the rubber masterbatch by mill mixing.

In order to determine the improvement in adhesion obtained when Neoprene is added to the natural rubber skim stock, T-adhesion tests (rubber-steel cord) were conducted.

The test utilized T-adhesion pads prepared by placing 60 gauge slabs of uncured fully compounded rubber skim stock on 51 gauge fabric reinforced rubber backing. Commercial brass-coated and zinc-coated cables were placed between two pads of the reinforced skim stock with the wires in contact with the uncured rubber skim at 1.25 cm intervals. The construction of the cables included a core of two wires which were wrapped by seven strands of wire 0.22 mm in diameter which were in turn wrapped by a single strand of wire 0.15 mm in diameter. The width of each adhesion pad was 1.25 cm. The pads were placed in a preheated curing mold and were cured for 30 minutes at 149° C. Rubber-steel cord adhesion testing was done on a Model 1130 Instron Universal Tester at a crosshead speed of 25.4 cm per minute and 110° C. The T-adhesion pads were preheated in the 110° C. oven for 20 minutes prior to testing. Oven aging of the cured T-adhesion pads was done in a forced air oven at 121° C. for two days. Steam bomb aging of the cured samples was done in a pressure tight bomb for one hour at 149° C., in a saturated steam atmosphere. Long term humidity chamber aging was conducted in an environmental chamber having 90 percent relative humidity and at 35° C.

DETAILED T-ADHESION TEST PROCEDURE

1. Using a Clicker machine and a 15.24 × 1.25 cm die, prepare an adequate number of calendered and control stock samples for T-adhesion pad building.
2. Use one piece of calendered fabric reinforced rubber backing (0.1295 cm).
3. Ply one piece of 60 gauge control rubber stock (0.1524 cm) onto the fabric backing.
4. Place sample in building jig with fabric side down.
5. Place ten cords (of brass or zinc coated wire or cable) approximately 17.78 cm in length equally spaced on top of the two piece assembly.
6. Invert another 2 ply assembly, made as in items 1, 2 and 3, on top of cords so that cords are between the 2 layers of rubber skim stock to be tested.
7. This assembly should now fit snugly into the curing mold.
8. Adhesion pads shall be cured for 30 minutes at 149° C. and then allowed to equilibrate for 24 hours prior to testing.
9. Testing Machine: Model 1130 Instron Universal Tester.
10. Test speed 25.4 cm/minute; testing temperature, 110° C. after 20 minutes preheat.
11. The top grip shall be of a special holder made for the cured sample, with a slot in the bottom to permit the sample to be inserted with the wires protruding. The bottom grip should be a wedge type, designed to exert increasing tightening as each wire is pulled from the cured sample.
12. Record 10 wire pull-outs and average. Multiply average pull-out force value by 0.3572 to obtain kilograms per centimeter.

In the tests which follow, the natural rubber skim stock, Stock A, was prepared and utilized as a control without Neoprene and for two separate examples in which Neoprene was added. With the exception of the natural rubber and Neoprene content, the ingredients of Stock A have been specified on the basis of parts per hundred parts of rubber (phr) according to the weight of the rubber, unless otherwise specified.

One of the ingredients employed in a conventional organo-cobalt complex, commercially sold under the name "Manobond C" which is known to facilitate rubber-to-metal adhesion.

Manobond C is a commercially available source of a cobalt and boron containing additive that is compatible in our formulation; it is believed to have the structure:

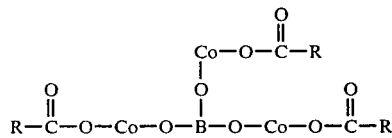

wherein R is an alkyl radical of from 9 to 12 carbons. Manobond C is available as a blue, viscous liquid; it contains 15.5 to 16.5% cobalt (Manobond C 16) or it contains 17.5 to 18.5% cobalt (Manobond C 18); it has a viscosity (at 25° C.) of 3,000 to 9,000 cps. The ash content is from 22 to 25 weight percent. Manobond C is commercially available from Wyrough and Loser, Inc., Trenton, N.J.

| Compounding Ingredients | Stock A |
|---|---|
| Natural rubber | 100 |
| HAF carbon black | 60 |
| Zinc Oxide | 7.5 |
| Stearic Acid | 0.5 |
| Firebrake ZB*[1] | 2.2 |
| Hydrocarbon resins | 2.0 |
| Ajone DD*[2] | 2.0 |
| Shell SPX 97 oil | 2.0 |
| Manobond C*[3] | 2.0 |
| NOBS Special*[4] | 0.8 |
| Sulfur MB*[5] | 7.5 |
| Santoflex 13 AO*[6] | 1.0 |
| Santogard PVI*[7] | 0.4 |

*[1] Zinc borate
*[2] 6-dodecyl-1,2-dihydro-2,2,4-trimethylquinoline
*[3] Organo-cobalt-boron complex ~16% cobalt
*[4] N-Oxydiethylene benzothiazole 2-sulfenamide
*[5] 80% Insoluble sulfur and 20% process oil
*[6] N-(1,3 dimethylbutyl)-N'-phenyl-p-phenylenediamine
*[7] N-(cyclohexylthio)phthalimide In the series of tests which follow, Example 1 was the control, containing no Neoprene; Example 2 represents Stock A to which 5 parts by weight of Neoprene were added replacing an equivalent amount of natural rubber; and Example 3 represents Stock A to which 10 parts by weight of Neoprene were added, again replacing an equivalent amount of natural rubber.

Seven sets of tests were conducted on Examples 1-3 and these are reported in Table I. These tests included T-adhesion determination for vulcanized specimens—unaged or unconditioned, Test A; oven aged, Test B; steam bomb aged, Test C; and, humidity chamber aged, Tests D-G. The force necessary to pull or remove the metallic reinforcement from the vulcanized rubber skim stock is given first, in Kg/cm, followed by the percent of rubber skim stock remaining on the surface of the metallic reinforcement. The amount of rubber skim stock remaining on the metallic reinforcement is determined by visual examination and reported as % rubber coverage.

TABLE I
Effects of Different Levels of Neoprene in Stock A

| | Example 1 | Example 2 | Example 3 |
|---|---|---|---|
| Natural Rubber | 100 | 95 | 90 |
| Neoprene W | — | 5 | 10 |
| Test A | | | |
| Unaged or unconditioned Plated Steel Cord[a] | | | |
| Brass-plated | | | |
| Kg/cm | 29.58 | 28.86 | 27.08 |
| % rubber coverage | 95 | 95-100 | 95-100 |
| Zinc-plated | | | |
| Kg/cm | 32.72 | 31.68 | 30.75 |
| % rubber coverage | 95 | 95-100 | 95-100 |
| Test B | | | |
| Oven Aged Plated Steel Cord[b] | | | |
| Brass-plated | | | |
| Kg/cm | 24.47 | 23.22 | 25.00 |
| % rubber coverage | 90 | 95 | 95 |
| Zinc plated | | | |
| Kg/cm | 17.86 | 20.90 | 18.22 |
| % rubber coverage | 85 | 85-90 | 85 |
| Test C | | | |
| Steam Bomb Aged Plated Steel Cord[c] | | | |
| Brass-plated | | | |
| Kg/cm | 24.65 | 25.00 | 22.86 |
| % rubber coverage | 90 | 90 | 90-95 |
| Zinc-plated | | | |
| Kg/cm | 25.18 | 25.72 | 25.72 |
| % rubber coverage | 90 | 95-100 | 100 |
| Test D | | | |
| 0 Day Humidity Chamber Test Plated Steel Cord[d] | | | |
| Brass-plated | | | |
| Kg/cm | 30.00 | 30.00 | 28.04 |
| % rubber coverage | 90-95 | 95 | 95-100 |
| Zinc-plated | | | |
| Kg/cm | 27.86 | 28.40 | 28.93 |
| % rubber coverage | 95 | 95 | 95 |
| Test E | | | |
| 60 Day Humidity Chamber Test[d] | | | |
| Brass-plated | | | |
| Kg/cm | 20.54 | 22.86 | 22.50 |
| % rubber coverage | 65-70 | 75-80 | 80-85 |
| Zinc-plated | | | |
| Kg/cm | 18.04 | 21.79 | 24.11 |
| % rubber coverage | 20 | 70 | 80-85 |
| Test F | | | |
| 120 Day Humidity Chamber Test[d] | | | |
| Brass-plated | | | |
| Kg/cm | 19.65 | 22.33 | 23.93 |
| % rubber coverage | 60 | 80 | 85 |
| Zinc-plated | | | |
| Kg/cm | 13.04 | 15.00 | 16.43 |
| % rubber coverage | 0 | 10 | 25 |
| Test G | | | |
| 180 Day Humidity Chamber Test Plated Steel Cord[d] | | | |
| Brass-plated | | | |
| Kg/cm | 18.65 | 22.15 | 21.72 |
| % rubber coverage | 40 | 50-55 | 60-65 |
| Zinc-plated | | | |
| Kg/cm | 11.75 | 13.14 | 13.75 |
| % rubber coverage | 0 | 0 | 0 |

[a] T-adhesion pads cured 30 minutes at 149° C., and tested at 110° C.
[b] T-adhesion pads cured 30 minutes at 149° C., heat aged for 2 days in a forced air oven at 121° C. and tested at 110° C.
[c] T-adhesion pads cured 30 minutes at 149° C., steam bomb aged 1 hour at 149° C. and tested at 110° C.
[d] T-adhesion pads cured 30 minutes at 149° C., aged in humidity chamber at 90% relative humidity and 35° C. and tested at 110° C.

As can be seen from Table I, Test A, Examples 1-3, adhesion was better where the Stock A T-adhesion pads were applied to zinc-plated steel cords rather than brass-plated steel cord. Adhesion was marginally reduced from the control where Neoprene had been added, however, percent rubber coverage, or adhesion retention, can be seen to be marginally improved by the addition of the Neoprene.

In Test B, adhesion was better for the brass-plated steel cords than for the zinc-plated and it is seen that the addition of Neoprene did not deleteriously affect adhesion or rubber coverage and actually gave some improvement. The oven aging test is an accelerated heat aging test and is significant in determining the effect of heat on the thermal stability of the chemical bonds formed between the rubber skim stock and the metallic reinforcement during vulcanization. In Test C, adhesion was better with brass-plated steel cord than with zinc-plated steel cord and again, the presence of Neoprene was not overall detrimental. Steam bomb aging for one hour at 149° C., is an accelerated humidity aging test and is significant in determining the chemical stability of the chemical bonds formed between the rubber skim stock and the metallic reinforcement when exposed to moisture or steam under pressure.

Lastly, Tests D–G which represent 0, 60, 120 and 180 day humidity chamber testing, respectively, show that although adhesion began to be deleteriously affected by the humidity as residence time increased for the 60, 120 and 180 day tests, improved adhesion and rubber coverage was demonstrated for Examples 2 and 3 containing Neoprene.

Significance of the humidity chamber tests is again in determining the chemical stability of chemical bonds formed between the rubber skim stock and the metallic reinforcement when exposed to conditions of high relative humidity and high temperature, as compared to ambient, and extended periods of time.

In order to demonstrate the higher modulus of rubber skim stocks containing Neoprene over the control, stress-strain properties were determined for Examples 1–3 and are reported in Table II. It will also be noted therein that tensile strength and elongation at break remained comparable to the control when Neoprene was added. Measurements were determined on samples cured at 149° C. for various periods of time.

TABLE II

Stress-Strain Properties of Cured Rubber Skim Stocks Upon the Addition of Increasing Amounts of Neoprene

|  | Example 1 | Example 2 | Example 3 |
| --- | --- | --- | --- |
| Natural Rubber | 100 | 95 | 90 |
| Neoprene W | — | 5 | 10 |
| 100% Modulus Kg/cm$^2$ | | | |
| 15 min. | 50.97 | 54.48 | 56.24 |
| 23 min. | 54.48 | 59.76 | 61.52 |
| 30 min. | 54.48 | 59.76 | 63.27 |
| 200% Modulus Kg/cm$^2$ | | | |
| 15 min. | 116.00 | 123.03 | 126.54 |
| 23 min. | 119.51 | 130.01 | 135.33 |
| 30 min. | 119.51 | 128.30 | 138.84 |
| 300% Modulus Kg/cm$^2$ | | | |
| 15 min. | 182.78 | 195.08 | 202.11 |
| 23 min. | 193.33 | 196.84 | — |
| 30 min. | 193.33 | 202.11 | — |
| Tensile Strength Kg/cm$^2$ | | | |
| 15 min. | 209.14 | 210.9 | 207.39 |
| 23 min. | 196.84 | 198.60 | 198.60 |
| 30 min. | 205.62 | 202.11 | 195.08 |
| Elongation at Break Percent | | | |
| 15 min. | 22.84 | 23.20 | 22.50 |
| 23 min. | 21.79 | 21.79 | 21.09 |
| 30 min. | 22.50 | 21.09 | 20.04 |

Based on the foregoing results reported in Tables I and II, we consider the presence of Neoprene in a rubber skim stock to be effective in promoting adhesion between the rubber skim stock and metallic reinforcement. Moreover, the presence of Neoprene provides higher modulus than 100 percent natural rubber skim stocks with equivalent elongations at break for both.

Inasmuch as the presence of moisture and oxygen in a cured rubber skim stock appears to effect deleteriously the stability of chemical bonds formed between the rubber skim stock composition and the metallic reinforcement, as born out by Example 1 in Table I, the presence of Neoprene, as set forth in Examples 2 and 3, improves the bond stability. Therefore, by improving metal adhesion and metal adhesion retention in articles such as tires, which are exposed to varying levels of moisture and oxygen during normal service, greater article life should result, thereby allowing a higher percentage of steel belted radial tires to be retreadable.

As stated hereinabove, the wire coated in the practice of our invention can be, for example, brass-plated wire, i.e., 70% Cu, 30% Zn; zinc-plated or bright steel. The wire can be in the form of a strand, mat, web, ply or braid.

The improved rubber skim stock disclosed herein also finds utility in, for example, brassed metal-rubber articles such as motor mounts, cutless bearings, torsilastic springs, power belts, printing rolls, metal wire reinforced or braided hose, electrical deicers, shoe heels and wherever it is desired to secure rubber to metal or provide a flexible and strong, thermally stable bond between the same.

Thus, it can be seen that the disclosed invention carries out the objects set forth hereinabove. As will be apparent to those skilled in the art, the composition of the rubber skim stock can be varied within the scope of our total specification disclosure by the selection of the specific types of Neoprene as well as the amounts thereof, and it is believed that the preparation and use of such rubber skim stocks can be determined without departing from the spirit of the invention herein disclosed and described, the scope of the invention being limited solely by the scope of the attached claims.

We claim:

1. In a cured rubber skim stock composition containing natural rubber, having better adhesion and adhesion retention with metallic reinforcement embedded therein, the improvement wherein:
   from about 5 to about 25 parts by weight of Neoprene is incorporated replacing an equivalent amount of the natural rubber.

2. A cured rubber skim stock composition, as set forth in claim 1, wherein said metallic reinforcement is selected from the group consisting of steel cord, brass-plated steel cord and zinc-plated steel cord.

3. In a tire having metallic reinforcing elements embedded in vulcanized rubber skim stock containing natural rubber, said stock having better adhesion and adhesion retention with said metallic reinforcement, the improvement wherein:
   from about 5 to about 25 parts by weight of Neoprene is incorporated into said skim stock replacing an equivalent amount of the natural rubber.

4. A tire, as set forth in claim 3, wherein the metallic reinforcement is selected from the group consisting of steel cord, brass-plated steel cord and zinc-plated steel cord.

* * * * *